United States Patent [19]

Stamm

[11] 4,192,977
[45] Mar. 11, 1980

[54] HIGHLY DIRECTIONAL ULTRASONIC ELECTRET TRANSDUCER

[75] Inventor: Kurt Stamm, Vienna, Austria

[73] Assignee: AKG Akustische u. Kino-Geräte Gesellschaft m.b.H., Austria

[21] Appl. No.: 861,342

[22] Filed: Dec. 16, 1977

[30] Foreign Application Priority Data

Dec. 20, 1976 [AT] Austria .................. 9440/76

[51] Int. Cl.² ............. H04R 1/34; H04R 19/00
[52] U.S. Cl. ................. 179/111 E; 177/121 D; 73/632
[58] Field of Search ........... 179/1 SS, 111 R, 111 E, 179/121 D; 116/137 A; 73/587, 596, 603, 606, 632; 181/159, 175, 176

[56] References Cited

U.S. PATENT DOCUMENTS

| Re. 28,420 | 5/1975 | Murphy | 179/111 E |
|---|---|---|---|
| 1,811,638 | 6/1931 | Lieber | 179/179 |
| 2,063,944 | 12/1936 | Pierce | 179/1 SS |
| 2,542,594 | 2/1951 | Tiffany | 179/1 SS |
| 3,835,254 | 9/1974 | Ohasi et al. | 179/1 SS |

FOREIGN PATENT DOCUMENTS 1123333  9/1956  France ...................... 179/111

*Primary Examiner*—George G. Stellar
*Attorney, Agent, or Firm*—McGlew and Tuttle

[57] ABSTRACT

An ultrasonic converter having a single side, focused, substantially secondary radiation free directional characteristic, comprises an exponential horn-like directional element and a capacitative transducer with an electret diaphragm. A pre-staged resonator aids in controlling the directional characteristic. The capacitive transducer has an approximately bell-shaped curvature-like diaphragm velocity distribution which tapers off toward the diaphragm edge to improve the focusing which is achieved by employing a non-uniform charge across the surface of the electret diaphragm tapering off toward its edge and a backplate arrangement which supports the diaphragm at a plurality of selected points with a selected dimensioning of singular volumes behind the counter-electrode bores.

7 Claims, 5 Drawing Figures

HIGHLY DIRECTIONAL ULTRASONIC ELECTRET TRANSDUCER

FIELD AND BACKGROUND OF THE INVENTION

This invention relates to electro-sonic devices in general and, in particular, to a new and useful ultrasonic converter having a single side, focused, substantially secondary radiation free directional characteristic.

DESCRIPTION OF THE PRIOR ART

Ultrasonic converters have recently gained in importance because they are well suited for remote control, burglar alarm installations and many other purposes. Compared with non-directional converters of identical energy input, their range is a multiple higher because of their sharp focused directional characteristic or, in other words, at an identical range of operation, less energy is required if the converter operates as an acoustic radiator and/or its sensitivity is a multiple higher if utilized as a sound pickup.

Generally, secondary radiations also show up with ultrasonic converters having a focused directional characteristic. In this case, this is referred to as an ear lobe-like distorted characteristic. Secondary radiations are undesirable, of course, and various proposals have been made for the elimination thereof, if possible, with an even sharper focusing characteristic. Proposed radiator groups, for example, show up negligible secondary radiations only if a relatively great amount of single radiators is used. Such a radiator group has large space requirements and, therefore, cannot be utilized in any given place.

Another proposal for ultrasonic converters involves a parabolic reflector, but this also does not seem to be the ideal solution since the mirror diameter must substantially exceed the converter diameter, whereas, the requirement that the converter be dimensioned smaller than the wave length used must be met. Furthermore, the converter must be high-precision fixed in the mirror focal point. Another known idea is to stage a tube which is lined with a sound-absorbing material ahead of the converter. The drawback of this arrangement, which would be dimensionally acceptable, is that the damper material lined tube produces a substantial drop in the efficiency rating which, on a damping average, amounts to about 10 db.

SUMMARY OF THE INVENTION

The present invention provides an ultrasonic converter having none of the drawbacks of the known designs and is of a small size, and is therefore able to be built-in anywhere, thus reducing costs of manufacture while still having an extremely sharp focused, secondary radiation free directional characteristic.

According to the invention, this is accomplished by having a capacitive converter which preferably incorporates an electret diaphragm with a velocity distribution drop toward the diaphragm edge, arranged at the end of a horn-like directional element, which expands toward the other end, preferably by approximation according to an exponential function.

Basically, the invention thus presents a combination of a converter having specified characteristics and an acoustic horn. The combination of converters and horns have been known for some time, specifically in the field of acoustics. There, however, the horn serves less for the development of a sharp, focused, single side directional characteristic than the adaption of radiator impedance to the open space. For this purpose, and in most cases, an additional velocity transformation between the converter diaphragm and the horn inlet is provided. The primary target of this arrangement is an adaptive type of improving the converter efficiency. Its purpose is not that of sharp focusing, which may not be desired at all, and accordingly, it does not have it because generally the horn opening has such a diameter that with respect to sound radiation, this is a case of planar waves.

A condition for the invention is the use of a converter already characterized by a certain focusing property with little or no secondary radiation. Such a converter can be formed for example by a capacitive converter type where, on exciting with a proper frequency, the diaphragm velocity distribution shows an approximately bell curve time slope across the diaphragm diameter. This can be accomplished relatively easily with an electret diaphragm equipped converter so that the diaphragm distributed charge drops toward the diaphragm edge according to a bell curvature-like velocity distribution.

Other ways of imparting the required velocity distribution on the diaphragm to a converter are given, e.g., by a converter design, where the diaphragm is set up on counter electrode projections at a few points and a system of partial diaphragms is produced. By a proper selection of support point spacings and numbers, and, in any given case, also the depth of singular volumes behind the counter-electrode bores usable converter capsule is also produced according to the invention. The velocity distribution of the capsule, equally viewed across the diaphragm diameter, shows an approximately bell-curved time slope.

A dimensional reduction of the ultrasonic converter, according to the invention, is so accomplished that the converter capsule, which usually has a cylindrical shape is simply inserted at the smaller horn opening, the inner diameter of which matches the outer diameter of the capsule. Thus, the backside of the capsule will flush-lock with the horn opening. The result is a very compact unit, which is of sufficiently small dimension for use at any location, where a high-output type of converter having a sharp-focused, secondary radiation free directional characteristic is needed. In any given case, a converter diaphragm pre-staged resonator also makes it feasible to have a combination of the directional element with other converter types.

Accordingly, it is an object of the invention to provide an ultrasonic converter which has a single side, focused, substantially secondary radiation free directional characteristic and which comprises a horn-like element having a capacitive converter at its inner end with an electret diaphragm therein, wherein the horn-like element flares, at least approximately following an exponential function to support the development of a directional characteristic which is free from secondary maxima as far as possible. The secondary maxima may be removed from a capacitive transducer having its diaphragm velocity distributed over the diaphragm diameter in accordance with a bell curve by suitably provided means, for example providing an electret with a characteristic charge distribution over the diaphragm diameter which follows a bell-shaped curve, or providing a specially constructed counter electrode arrangement. The directional characteristic of the converter can be controlled by providing a slightly cup-shaped perforated plate in front of the transducer diaphragm.

A further object of the invention is to provide an ultrasonic converter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
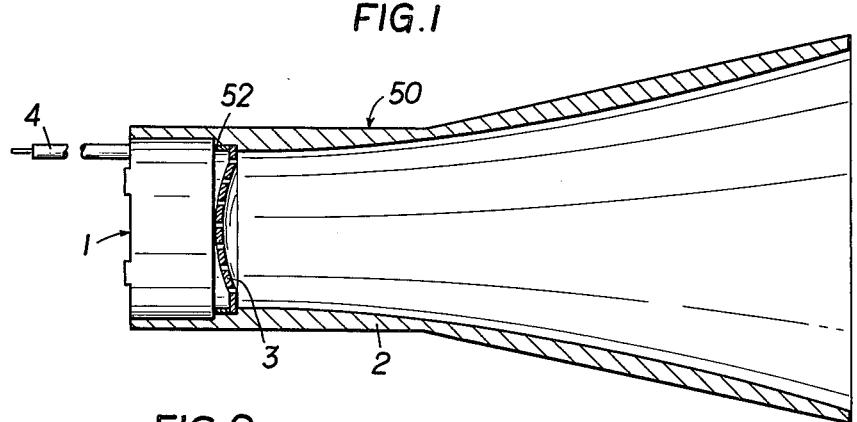
FIG. 1 is a schematic axial sectional view of an ultrasonic converter constructed in accordance with the invention.

Referring to the drawings in particular, the invention embodied therein, comprises an ultrasonic converter or transducer, generally designated 50, which includes an electret converter 1 arranged at the inner end of a horn-like directional unit or tubular member 2 as shown in FIG. 1.

The electret converter 1 is inserted in a horn-like directional element 2 adjacent an inner closed end. The converter 1 has a diaphragm 5 which is located in the horn behind a resonator 3, which has the shape of a slightly curved, circular small disc, with a plurality of bores. A resonator hollow space 52 is represented by the volume produced between diaphragm 5 and resonator disc 3. An electrical feeder line 4 is connected to a counter-electrode 6 of the electroacoustic converter 50.

Figure 2:
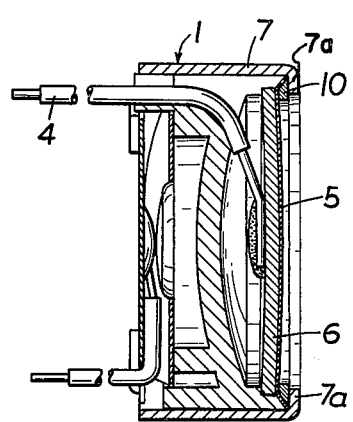
FIG. 2 is an enlarged cross-sectional view of the electret converter shown in FIG. 1.
Figure 3:
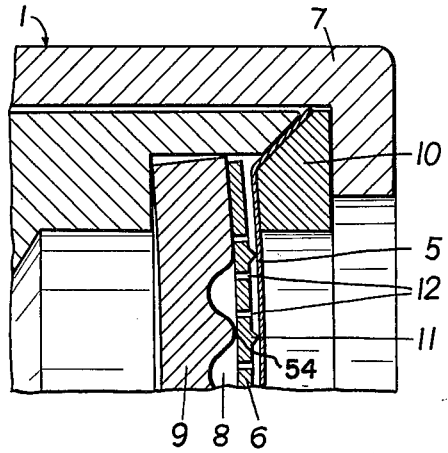
FIG. 3 is an enlarged detail of a portion of the converter shown in FIG. 2.

FIG. 2 shows a cross-section through the electret converter 1. It comprises a cylindrical capsule or housing 7, one side of which has a flanged edge 7a, against which a diaphragm-carrying ring 10 with a diaphragm 5 is anchored. The counter-electrode 6 is arranged at a small distance from the diaphragm 5 and it is provided with projections 11, which touch with their tips against the electret diaphragm 5. In this way, the diaphragm is subdivided into a system of partial diaphragms. The counterelectrode 6 has bores 12, which lead into hollow spaces 8 defined between projections 54 of supporting body 9.

Figure 4:
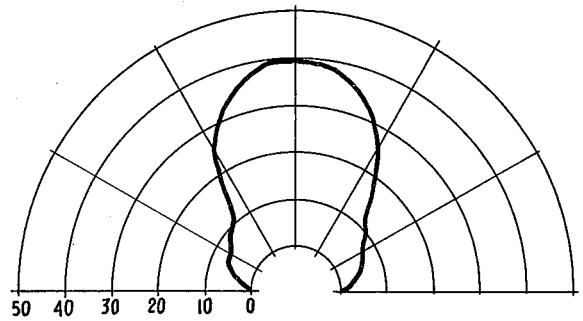
FIGS. 4 and 5 are polar diagrams indicating a comparison between the polar diagram of a prior art device shown in FIG. 4 and a device having sharp focusing in accordance with the invention, as indicated in FIG. 5.

A key condition for the invention is that the converter already have a directional characteristic maximally free from secondary radiations. Such a characteristic, e.g., is shown in FIG. 4. The improved characteristic of FIG. 5 can be attained by varying the points of support of diaphragm 5 on projections 11 of the counter-electrode by a proper dimensioning of singular volumes of hollow spaces 8 in the supporting body 9 and by a proper charge distribution on the surface of diaphragm 5. The diaphragm 5 advantageously has an electret charge corresponding to an approximately bell-curved diaphragm velocity distribution tapering off toward its edge. Finally, the directional characteristic of the converter can be controlled, according to the invention, by the pre-staging of the special shaped resonator 3, shown in FIG. 1.

Figure 5:
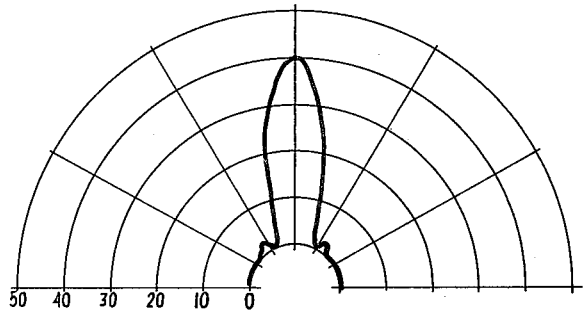

By providing such a converter with a horn-like directional element as shown in FIG. 1, a directional characteristic is obtained, as shown in FIG. 5. It is evident that the focusing has become extremely sharp. This fact is clearly proven by a comparison test diagram, as shown in FIGS. 4 and 5. The lobe produced by an arrangement according to the invention is only about a third in diameter of the converter lobe, its cross-section being practically only a tenth of the latter's. Both minimal secondary radiations detectable in the immediate proximity of the converter are so small as to be considered completely negligible.

In the case of a converter unable to meet the strict conditions regarding freedom from secondary radiations, the pre-staging of a resonator disc equipped horn-like tube will improve the directional characteristic, however, generally, nothing more will be attained than a directional characteristic typical for a correspondingly dimensioned converter without a directional element.

The ultrasonic converter 50 according to the invention can be used over a range of 30 kHz to 100 kHz, whereby, an about 15-kHz band can be covered by using tuned directional elements. It can be used both as an acoustic transmitter and as an acoustic pickup, whereby, transmitter characteristic and receiver characteristic practically coincide. A gain of and exceeding 8 db is attainable in an axial direction by using said directional element.

While a specific embodiment of the invention has been shown and described in detail to illustrate the application of the principles of the invention, it will be understood that the invention may be embodied otherwise without departing from such principles.

What is claimed is:

1. An ultrasonic converter having single side, focused, substantially secondary radiation free directional characterstic, comprising a horn-like directional element with an inner end and an outer opened end and walls extending outwardly toward the outer opened end preferably according to an exponential function, a capacitive transducer located in said horn-like directional element adjacent to and closing off its inner end and having an electret diaphragm facing toward the outer end of said horn-like element with a diaphragm edge, said diaphragm including means for producing an approximately bell curved velocity distribution thereon tapering off toward the diaphragm edge, said means for producing an approximately bell-curved velocity distribution comprising a distribution of the electret charge on said diaphragm corresonding to an approximately bell-curved diaphragm velocity distribution tapering off toward the edge of the diaphragm.

2. An ultrasonic converter, as claimed in claim 1, wherein said electret diaphragm includes a housing having a periphery substantially filling the inner end of said horn-like directional element to close this end of the directional element.

3. An ultrasonic converter, as claimed in claim 2, including a resonator arrangement arranged between said converter diaphragm and the open end of said horn-like directional element to increase directional characteristic of the converter.

4. An ultrasonic converter, as claimed in claim 3, wherein said resonator arrangement comprises a perforated slightly curved disc.

5. An ultrasonic converter having a single side, focused, substantially directional characteristic free from secondary maxima, comprising a tubular horn-like element having a tubular wall with an inner end and an outer open end and a wall between said outer and inner ends tapering outwardly to said outer end in a curve according to an exponential function, an electret converter in said horn-like element adjacent said inner end and having a housing with a diaphragm on a side of said housing facing toward said outer end, a diaphragm support member in said housing behind said diaphragm with a support face having projecting portions and hollow portions between the projecting portions, a counterelectrode disc having an inner face engaged on said support projecting portions and having an outer face with electrode disc projections urged against said diaphragm.

6. A ultrasonic converter, as claimed in claim 5, including a resonator disc disposed between said diaphragm and the open end of said horn-like element and having a curved perforated surface to increase the directional characteristic of the converter.

7. An ultrasonic converter according to claim 5 wherein said diaphragm has a charged distribution following a bell shaped curve decreasing toward the diaphragm edge.

* * * * *